United States Patent [19]

Rand

[11] 3,949,869

[45] Apr. 13, 1976

[54] DOCUMENT TRAY

[75] Inventor: Ralph K. Rand, New Milford, Conn.

[73] Assignee: Graphic Sciences, Inc., Danbury, Conn.

[22] Filed: May 1, 1975

[21] Appl. No.: 573,792

[52] U.S. Cl. .................................. 206/73; 211/57
[51] Int. Cl.² ...................... A47F 7/00; B65D 1/34
[58] Field of Search ........ 206/73, 214, 451; 211/50, 211/57, 59; 281/21 A, 25 A, 45, 50; 402/60

[56] References Cited
UNITED STATES PATENTS

| 241,716 | 5/1881 | Plummer | 402/60 |
| 852,288 | 4/1907 | McBee | 402/60 |
| 2,462,789 | 2/1949 | Trollen | 206/73 |

Primary Examiner—Steven E. Lipman
Attorney, Agent, or Firm—Kevin R. Peterson; Robert A. Green; William B. Penn

[57] ABSTRACT

The cassette of the invention comprises a plastic tray having at one end an array of projecting curved fingers and an auxiliary member having an array of curved fingers, with the auxiliary member adapted to seat on the base so that the curved fingers of the base form a smooth curve with the curved fingers of the auxiliary member. Before the auxiliary member is seated on the base, a plurality of separator sheets to be carried thereby are secured to the base by means of holes which are threaded on the first curved fingers. The auxiliary member is then seated in place, and ultrasonic vibrations are applied to heat and fuse the separate fingers to form unitary continuous curved rings which hold the sheets in place.

5 Claims, 3 Drawing Figures

DOCUMENT TRAY

BACKGROUND OF THE INVENTION

In one type of facsimile machine known in the prior art, documents to be transmitted are held in a stack between separator sheets which themselves are secured together by means of a metal ring binder. Such an arrangement works generally satisfactorily; however, it is relatively time consuming to form the assembly of separators and metal ring binder. In addition, an auxiliary carrier or tray is required to carry the paper-ring assembly. The present invention provides a combination tray and holder for the separator sheets on which the separator sheets are easily mounted.

SUMMARY OF THE INVENTION

Briefly, apparatus embodying the invention comprises a two-part plastic tray and auxiliary member, each of which carries portions of a ring. The tray and auxiliary member are assembled with their ring portions aligned and with punched separator sheets threaded on the ring portions carried by the tray. With the parts thus assembled, the aligned rings are heated and fused to form the desired assembly.

DESCRIPTION OF THE PREFERRED EMBODIMENTS

Figure 1:
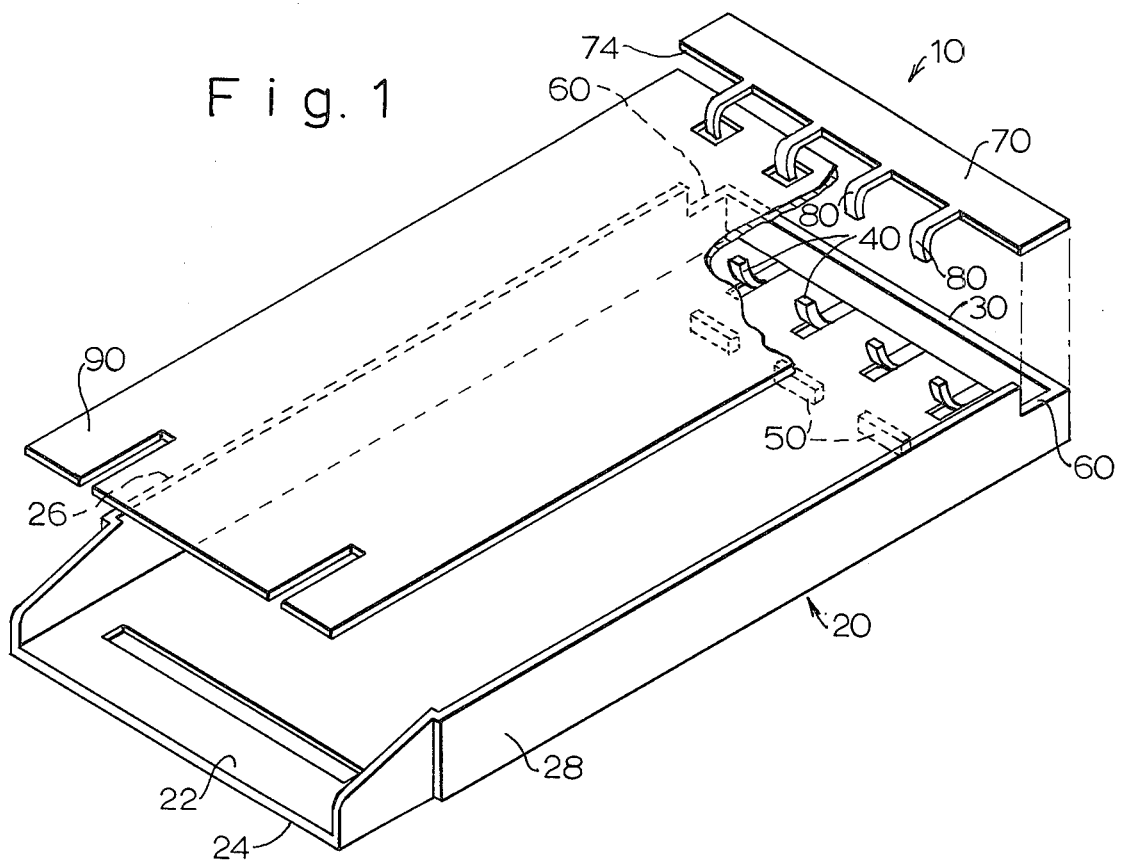
FIG. 1 is a perspective view of apparatus embodying the invention.
Figure 2:
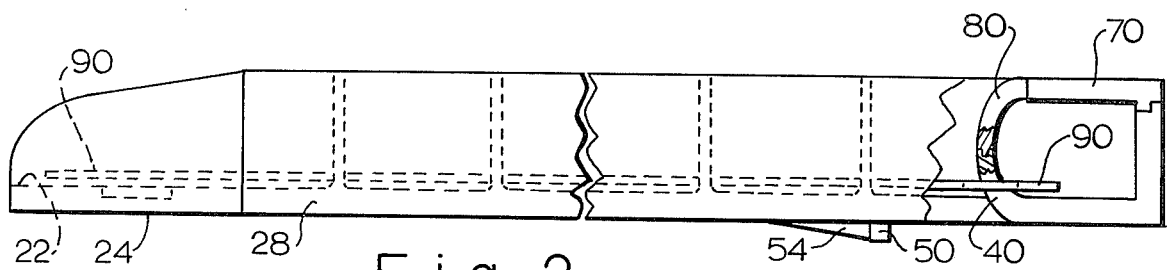
FIG. 2 is a side elevational view, partly in section, of the apparatus of FIG. 1.
Figure 3:
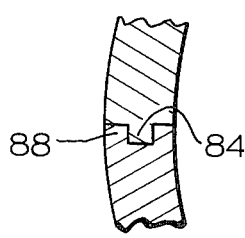
FIG. 3 is an enlarged sectional view of a portion of the apparatus of FIG. 1.

A tray 10 embodying the invention is preferably made of plastic which can be readily molded. The tray comprises a generally box-like member having a base 20 including a top surface 22, two side walls 26 and 28 and a rear wall 30, and a bottom surface 24. The top surface 22 of the base 20 is provided at one end with a plurality of generally curved first fingers 40 which are aligned parallel to the rear wall of the base. The bottom surface of the base is provided with a plurality of vertical plate-like guide members 50 disposed parallel to the rear edge of the base and each including a transverse wall 54 formed as a wedge and tapering toward the front end of the tray. At the rear of the tray, the side walls have a cut-out portion 60, and the rear wall is of the same height so that a three-sided ledge is provided along the rear portion of each side wall and the rear wall.

The tray includes an auxiliary member 70 which comprises a generally flat plate having an edge 74 from which a plurality of curved second fingers 80 extend. The auxiliary member is adapted to mesh with the tray, with the flat plate portion seated on the three-sided ledge and with the first fingers meeting the second fingers. Preferably, the front end of each second finger 80 includes a projecting tab 84 which enters a corresponding depression 88 in the front end of each first finger 40.

In using the tray of the invention, the tray with the auxiliary member 70 not in place, has a plurality of sheets 90 mounted on the first fingers 40 by means of holes 100 along an edge thereof, with the fingers 40 protruding through the holes. The sheets are thus held in place on the tray. The auxiliary member 70 is set in place, and the fingers 40 and 80 are ultrasonically welded together. A carrier and cassette are thus provided which can be readily coupled to reproducing apparatus such as a facsimile machine. The wedge-like members on the base of the tray permit the tray to be pushed along a portion of the facsimile machine, without having the vertical portions thereof catch on walls or sharp edges thereof.

What is claimed is:

1. A paper-carrying tray comprising
   a base member having side walls and a rear wall,
   a plurality of first ring-like members disposed on said base member adjacent to said rear wall, and
   an auxiliary member seated on said base member adjacent to said rear wall and having a plurality of second ring-like members extending from an edge thereof, with each second ring-like member aligned with and mating with one of said first ring-like members,
   said first and second ring-like members being fused together at the point where they contact each other.

2. The tray defined in claim 1 wherein said first members are aligned parallel to said rear wall.

3. The tray defined in claim 1 and including a plurality of sheets coupled to said fused ring members by means of apertures formed therein, said ring members being threaded through said apertures.

4. A paper-carrying tray comprising
   a base member having side walls and a rear wall, said rear wall and portions of said side walls adjacent thereto forming a support ledge, said ledge being disposed beneath the upper edges of the remainder of said side walls,
   a plurality of first ring-like members disposed on said base member aligned parallel to and adjacent to said rear wall, and
   an auxiliary plate-like member seated on said support ledge and having a plurality of second ring-like members extending from an edge thereof toward said first ring-like members, with each second ring-like member aligned with and mating with one of said first ring-like members,
   said first and second ring-like members being fused together at the point where they contact each other.

5. The tray defined in claim 4 wherein the top surface of said auxiliary member is coplanar with the top surface of the remainder of said side walls.

* * * * *